US008813122B1

(12) United States Patent
Montie et al.

(10) Patent No.: US 8,813,122 B1
(45) Date of Patent: *Aug. 19, 2014

(54) APPARATUS AND METHOD FOR SELECTING, SCHEDULING, AND REPRODUCING PROGRAMS WHILE ACCOUNTING FOR SCHEDULING GAPS

(75) Inventors: Edwin A. Montie, Eindhoven (NL); Warner R. T. Ten Kate, Eindhoven (NL); Frank Uittenbogaard, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/469,875

(22) Filed: Dec. 22, 1999

(30) Foreign Application Priority Data

Dec. 23, 1998 (EP) .................................... 98204426

(51) Int. Cl.
| | |
|---|---|
| *H04N 7/10* | (2006.01) |
| *H04N 7/025* | (2006.01) |
| *H04N 7/16* | (2011.01) |
| *H04N 7/173* | (2011.01) |
| *H04N 5/445* | (2011.01) |
| *G06F 3/00* | (2006.01) |
| *G06F 13/00* | (2006.01) |
| *H04N 21/458* | (2011.01) |
| *H04N 21/482* | (2011.01) |
| *H04N 21/433* | (2011.01) |
| *H04N 21/44* | (2011.01) |

(52) U.S. Cl.
CPC ......... *H04N 21/458* (2013.01); *H04N 21/4825* (2013.01); *H04N 21/4826* (2013.01); *H04N 21/482* (2013.01); *H04N 21/4331* (2013.01); *H04N 21/433* (2013.01); *H04N 21/4821* (2013.01); *H04N 21/44016* (2013.01); *H04N 21/4334* (2013.01); *H04N 21/4583* (2013.01)

USPC ................... 725/34; 725/32; 725/46; 725/47; 725/59; 725/100; 725/142; 725/56; 725/87; 725/89; 386/292; 386/293

(58) Field of Classification Search
CPC ............ H04N 21/458; H04N 21/4583; H04N 21/482; H04N 21/4825; H04N 21/4826; H04N 21/4821; H04N 21/433; H04N 21/4331; H04N 21/4334; H04N 21/44016
USPC ......... 725/8, 35, 58, 133, 134, 141, 142, 153, 725/34, 32, 46, 47, 56, 59, 87, 89; 386/1, 386/68, 83
See application file for complete search history.

(56) References Cited

U.S. PATENT DOCUMENTS 5,371,551 A * 12/1994 Logan et al. ................... 348/571
5,410,344 A * 4/1995 Graves et al. ................... 725/46

(Continued)

FOREIGN PATENT DOCUMENTS

WO         WO 0040028 A1 * 7/2000 ............. H04N 5/445

OTHER PUBLICATIONS

Definition of "Broadcast", The American Heritage Dictionary (2nd Edition), Houghton Mifflin Company, 1982.*

(Continued)

*Primary Examiner* — Pankaj Kumar
*Assistant Examiner* — Usha Raman

(57) ABSTRACT

The invention relates to an apparatus for reproducing programs, comprising storage means for storing a plurality of stored programs, for example, a television receiver comprising or controlling a video recorder. The apparatus comprises scheduling means for composing a personal reproduction schedule of a subset of said plurality of stored programs, in accordance with a user profile. If the apparatus is also capable of receiving broadcast programs, the scheduling means are adapted to include said broadcast programs in the reproduction schedule. A user-selectable virtual channel may be provided for easy inspection and execution of the reproduction schedule.

2 Claims, 2 Drawing Sheets

(56) References Cited

U.S. PATENT DOCUMENTS

| | | | |
|---|---|---|---|
| 5,528,304 A * | 6/1996 | Cherrick et al. | 725/41 |
| 5,534,911 A | 7/1996 | Levitan | 348/1 |
| 5,600,573 A * | 2/1997 | Hendricks et al. | 725/109 |
| 5,684,525 A * | 11/1997 | Klosterman | 725/48 |
| 5,706,388 A * | 1/1998 | Isaka | 386/125 |
| 5,758,257 A * | 5/1998 | Herz et al. | 725/116 |
| 5,758,259 A * | 5/1998 | Lawler | 725/45 |
| 5,805,974 A * | 9/1998 | Hite et al. | 725/69 |
| 5,892,536 A * | 4/1999 | Logan et al. | 725/34 |
| 5,995,153 A * | 11/1999 | Moeller et al. | 375/240.01 |
| 6,005,603 A * | 12/1999 | Flavin | 725/32 |
| 6,029,045 A * | 2/2000 | Picco et al. | 725/34 |
| 6,272,278 B1 * | 8/2001 | Takahata et al. | 386/46 |
| 6,414,720 B1 * | 7/2002 | Tsukidate et al. | 348/469 |
| 6,438,752 B1 * | 8/2002 | McClard | 725/46 |
| 6,486,920 B2 * | 11/2002 | Arai et al. | 348/563 |
| 6,601,237 B1 * | 7/2003 | Ten Kate et al. | 725/47 |
| 6,604,239 B1 * | 8/2003 | Kohen | 705/36 R |
| 6,698,020 B1 * | 2/2004 | Zigmond et al. | 725/34 |
| 6,728,678 B2 * | 4/2004 | Bhadkamkar et al. | 704/270 |
| 7,669,223 B1 * | 2/2010 | Hendricks et al. | 725/116 |
| 2002/0054752 A1 * | 5/2002 | Wood et al. | 386/83 |
| 2002/0057893 A1 * | 5/2002 | Wood et al. | 386/46 |
| 2003/0149976 A1 * | 8/2003 | Shah-Nazaroff et al. | 725/34 |
| 2005/0039219 A1 * | 2/2005 | Cooper et al. | 725/134 |
| 2006/0200259 A1 * | 9/2006 | Hoffberg et al. | 700/86 |
| 2007/0089136 A1 * | 4/2007 | Kumai et al. | 725/46 |

OTHER PUBLICATIONS

Avrum D. Lank "Memorable or not, Super Bowl commercials keep 'em viewing". Milwaukee Sentinel. Jan. 31, 1995. FindArticles.com. Jan. 24, 2008.*

* cited by examiner

APPARATUS AND METHOD FOR SELECTING, SCHEDULING, AND REPRODUCING PROGRAMS WHILE ACCOUNTING FOR SCHEDULING GAPS

FIELD OF THE INVENTION

The invention relates to an apparatus for reproducing programs, comprising storage means for storing a plurality of stored programs.

The invention further relates to a method of reproducing programs from a plurality of stored programs.

BACKGROUND OF THE INVENTION

An apparatus as defined above is widely known. For example, a video recorder is capable of storing TV programs onto a video tape or a video disk, and reproducing said programs on a TV screen, e.g. of a television which is connected to the video recorder. Televisions are known which have a built-in video recorder or are capable of controlling connected video recorder. The invention relates to any of such apparatuses.

It is also known to store a table of contents comprising information about the programs stored on a collection of video tapes or video disks. This table can be inspected by a user, allowing the user to select a program to be reproduced, possibly after following instructions to insert the right tape or disk. The apparatus is then capable of locating the start of the selected program automatically. Despite such measures, it remains difficult for the user to keep track of all the programs in the video collection. As a consequence, it is difficult to find programs which suit the user's needs at a particular moment.

OBJECT AND SUMMARY OF THE INVENTION

It is an object of the invention to assist the user in selecting programs from the storage means to be reproduced. To this end, the apparatus according to the invention is characterized in that the apparatus comprises scheduling means which are adapted to select a subset of said plurality of stored programs and compose a reproduction schedule of said subset in accordance with a user profile, the apparatus being adapted to reproduce the stored programs of said subset in accordance with said reproduction schedule. In this way, it is achieved that stored programs are as easily accessible as broadcast programs received from an antenna or cable network. Users are accustomed to being given ready-to-view program schedules, one for each TV channel received. The apparatus according to the invention proposes a similar program schedule to the user, differing only in that the programs of the schedule are obtained from a local storage device. In such a way, an 'evening program' could be composed which consists entirely of stored programs. The user profile could comprise simple guidelines, e.g. scheduling in order of recording. However, in a preferred embodiment, aspects of said user profile are a succession of program categories and/or a maximum duration of the reproduction schedule. For example, the user profile may specify that the schedule should have a duration of about three hours, and preferably start with a quiz, end with a movie, and further comprise a comedy or music program. Such program category information can be stored along with the programs and obtained by hand coding or using information from the Internet or service information from a digital broadcast stream, e.g. DVB-SI. If multiple episodes of a TV series are currently stored, the scheduling means could take their serial number into account and select always the one with the lowest serial number.

A further embodiment of the apparatus according to the invention is characterized in that the apparatus further comprises user-operable editing means for altering the reproduction schedule and/or the user profile. In this way, it is achieved that, if the user does not like the reproduction schedule as proposed by the scheduling means, the user is allowed to reorder the programs of the schedule, or replace them by other programs. Also, the user may be allowed to edit the user profile, i.e. the rules which are used by the scheduling means for composing the reproduction schedule. Thus, user profiles may be specified explicitly by the user. However, they may also be generated by means of habit watching. Prototypical user profiles may be built in by the manufacturer of the apparatus or downloaded via a communication channel.

A further embodiment of the apparatus according to the invention, further comprising receiving means for receiving broadcast programs from a plurality of channels, and selection means for selecting a subset of said broadcast programs, is characterized in that the scheduling means are further adapted to include broadcast programs of said subset of broadcast programs in the reproduction schedule. In this way, it is achieved that both broadcast programs and stored programs can be included in the reproduction schedule composed by the scheduling means, which enables the reproduction schedule to comprise an attractive mix of topical programs and stored programs. The selection means may comprise an electronic program guide (EPG), allowing a user to select broadcast programs manually. Alternatively, the selection means are capable of selecting broadcast programs automatically in accordance with user preferences registered in a user profile.

In general, including broadcast programs in the reproduction schedule yields gaps between these programs, because they may be received through different channels at different times. A preferred embodiment is characterized in that the scheduling means are further adapted to fill a gap in the reproduction schedule before or after a broadcast program with at least a part of a stored program. As the apparatus has knowledge of the length of the stored programs and the length of the gap, it is able to select one or more stored programs which fill the gap, and comply with the user profile, as much as possible. In a further embodiment, the apparatus according to the invention is capable of controlling the speed of reproducing a stored program. By slightly increasing or decreasing the reproduction speed, it becomes possible to fill a gap exactly, or better, leaving a small pause of predetermined length between the consecutive programs. Alternatively, a stored program may be interrupted for a broadcast program, e.g. a stored movie could be interrupted for a news bulletin.

An advanced embodiment is characterized in that the scheduling means are further adapted to avoid an overlap between a broadcast program of the reproduction schedule and a stored program of the reproduction schedule by recording at least a part of the broadcast program while reproducing the stored program, and reproducing the broadcast program after the stored program. Apparatuses which are capable of simultaneously recording a broadcast program and reproducing a stored program are known per se, e.g. a TV controlling two or more video recorders, or a video recorder having a fast cache memory allowing simultaneous data storage and retrieval. Such a capability can be utilized by the scheduling means to postpone a broadcast program until the reproduction of a stored program ends.

A further embodiment is characterized in that the apparatus further comprises virtual channel means for creating a user-selectable virtual channel for reproducing the programs of the reproduction schedule, the apparatus being adapted to control the receiving means to tune to a channel currently broadcasting a broadcast program of the reproduction schedule and to control the storage means to reproduce a stored program of the reproduction schedule. In this way, it is achieved that the user can select a virtual channel broadcasting the programs of the reproduction schedule. The virtual channel behaves like a normal channel to the user, hence it may be accessible through a preset number and be visible in an EPG. After selection of the virtual channel, the apparatus takes care of automatically switching between retrieving stored programs from the storage means or tuning to the genuine channels broadcasting the broadcast programs of the reproduction schedule. As a consequence, the user can view the scheduled programs by simply selecting the virtual channel.

BRIEF DESCRIPTION OF THE DRAWINGS

These and other aspects of the invention will be apparent from and elucidated by way of a non-limitative example with reference to a drawing in which.

DESCRIPTION OF EMBODIMENTS

Figure 1:
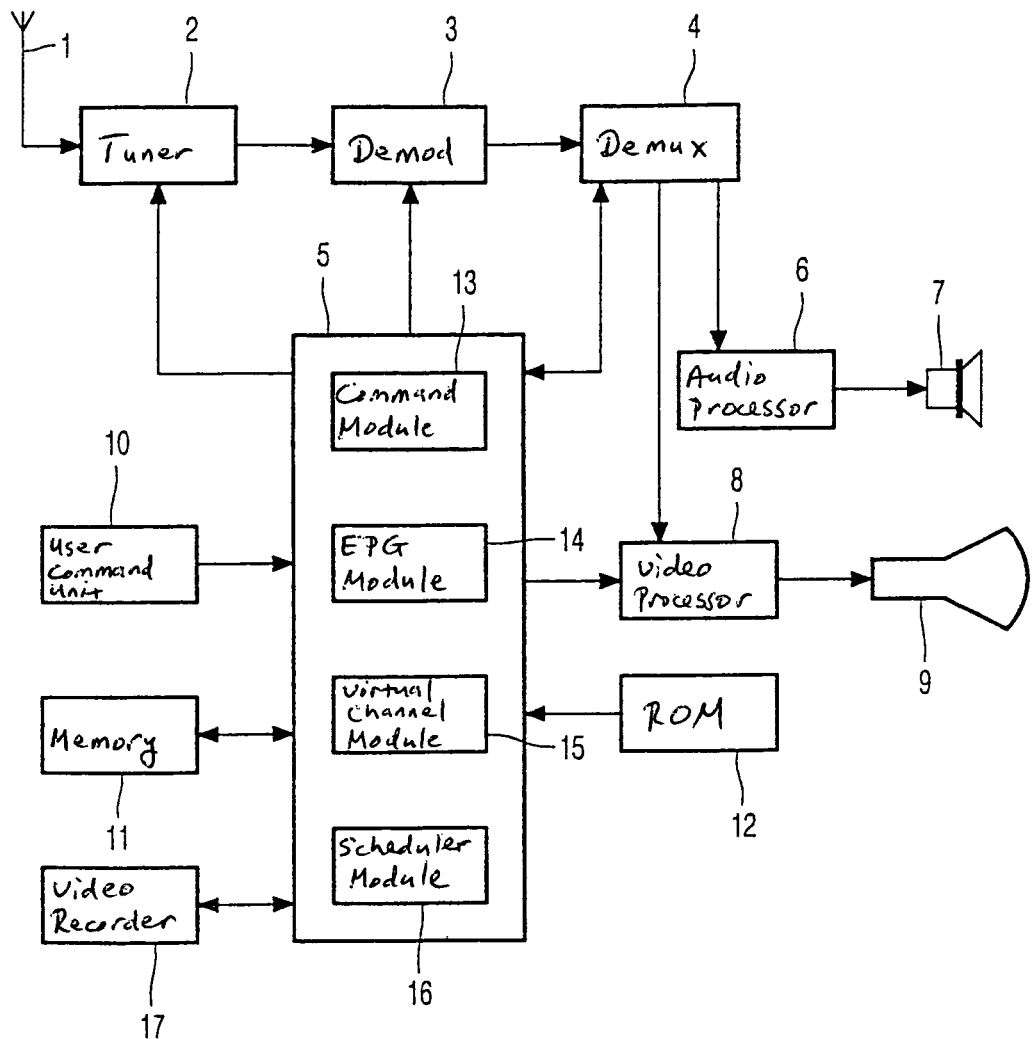
FIG. 1 shows a diagram of a digital television receiver as an embodiment of the apparatus according to the invention.

FIG. 1 shows a block diagram of a digital television receiver as an embodiment of the apparatus according to the invention. Digital broadcast streams, modulated on radio frequency (RF) signals, are received from the ether by an antenna 1 or, alternatively, from a cable network. The broadcast streams may be formatted, for example, in accordance with the Digital Video Broadcasting (DVB) standard. A tuner 2 comprises a standard analog RF receiving device which is capable of receiving said RF signals and selecting one of them to be output to a demodulator 3. Which signal tuner 2 selects is dependent upon control data received from a central processing unit (CPU) 5. The demodulator 3 converts the analog signal into a digital packet stream, based on control signals received from the CPU 5. This packet stream is then output to a demultiplexer 4, which decomposes the packet stream into elementary video, audio or data streams.

In an alternative embodiment of the invention, the packet stream is output from demodulator 3 directly to the CPU 5. In this embodiment, the CPU 5 performs the tasks of the demultiplexer 4, thereby eliminating the need for the demultiplexer 4.

A video processor 8 decodes the elementary video stream received from the demultiplexer 4 or from the CPU 5. In preferred embodiments of the invention, the video processor 8 is an MPEG-2 decoder; however, any decoder may be used as long as the decoder is compatible with the type of coding used to code the video data. Decoded video data is then transmitted to a display screen 9. An audio processor 6 decodes the elementary audio stream received from the demultiplexer 4. Again, any decoder may be used as long as the decoder is compatible with the type of coding used to code the audio data. Decoded audio data is then transmitted to a speaker system 7.

The demultiplexer 4 outputs the elementary data stream to the CPU 5. The CPU 5 comprises one or more microprocessors capable of executing program instructions stored in a read-only memory (ROM) 12. These program instructions comprise parts of software modules including, inter alia, a command module 13, an EPG module 14, a virtual channel module 15 and a scheduler module 16. Data processed by said software modules, e.g. DVB-SI data and user profile information, may be stored in a non-volatile memory 11. The command module 13 is capable of controlling functions of the TV-set and transmitting data to the video processor 8 to be presented on the screen 9. A user command unit 10 receives user commands, e.g. through a remote control (not shown), and transmits them to the command module 13 for processing. For example, when the user enters a channel number, the command module 13 controls the tuner 2 and the demultiplexer 4 to select the corresponding broadcast stream and data packets therein, and sends graphical data to the video processor 8 to present feedback on the screen 9, e.g. the preset number, while the channel name is being displayed for a few seconds.

A digital video recorder 17 is controlled by the CPU 5, and capable of storing and reproducing programs and DVB-SI data. It may be built in the television receiver or may be a separate device under the control of the television receiver.

The EPG module 14 interprets the DVB-SI data received from the demultiplexer 4 to collect information about the channels available in the received broadcast streams and about the programs scheduled for these channels. The EPG module 14 uses this information to generate an on-screen overview of programs scheduled for the channels in the received broadcast streams. It also allows the user to select programs to be viewed, recorded or reminded of. References to the selected programs are stored in the memory 11, which can be accessed by the virtual channel module 15. The virtual channel module 15 is capable of creating one or more virtual channels, featuring said selected programs stored in the memory 11. The creation of said virtual channels is accomplished by manipulating the DVB-SI tables in such a way that the command module 13 and the EPG module 14 automatically recognize the new channels, thus avoiding the need for substantial adaptations of said modules.

The scheduler module 16 is capable of composing a personal program schedule for any of the virtual channels, comprising recorded programs and/or broadcast programs. Such a personal program schedule may be composed in response to a user command, or automatically on a daily basis. For composing a personal program schedule, the user profile of the scheduler module 16 further comprises guidelines specifying how the schedule should be composed. Such guidelines may specify that the program schedule should have a certain duration, e.g. three hours, and should be a succession of particular program types, e.g. start with a quiz, end with a movie, and further comprise a comedy or music program. The scheduler module 16 allows multiple sets of guidelines to be stored, in order to suit multiple users or circumstances. Users are allowed to add, remove or alter such sets of guidelines by means of the user command unit 10. Guidelines may also be prestored by the manufacturer. Dependent on the programs available on the video recorder 17 and in the received broadcast streams, the scheduler module 16 composes a schedule which is, as much as possible, in conformity with the selected set of guidelines. For example, if the guidelines prescribe that the schedule should contain a comedy, but neither the video recorder 17 nor the broadcast streams provides a comedy, the scheduler module 16 may schedule a comic program, e.g. a cartoon or a cabaret. Rules for such adaptations may be supplied by the manufacturer, by the service information of a broadcast stream or by the user. Such a rule may specify, for example, that a cartoon or cabaret can be scheduled instead of a comedy, and vice versa. Another guideline may specify that broadcast programs have priority over recorded programs, to save storage capacity on the video recorder 17. The guidelines may range from simple to complex. For example, they could only specify the preferred start time and end time of the program schedule. The schedule may then, for example, be composed by taking the following successive steps:

Schedule all desired broadcast programs (in accordance with the user preferences in the user profile) between the start time and end time.

If overlaps between the broadcast programs occur, assign priority ratings and reserve the programs having lower ratings to be recorded and remove them from the program schedule.

If gaps occur, schedule recorded programs which fit in these gaps.

If the guidelines specify a succession of program categories, e.g. a quiz or a show, followed by a comedy or a cartoon, followed by a movie, the schedule may be composed by successively searching, for each category, a program of that category. In the first instance, the EPG of the broadcast streams is searched. If no broadcast program will start within a particular period of time after the previous program of the program schedule, the contents of the video recorder 17 is inspected. If a program of the desired category is available, it is scheduled. Otherwise, a stored program of arbitrary category is scheduled. Dependent on the available processing resources, the process of composing a program schedule may be more complex. For example, the process may be iterative, to find an optimal schedule having few gaps and conforming with the guidelines as well as possible. Dependent on the sophistication of the video recorder 17, various options for dealing with gaps and overlaps are available. If the video recorder 17 is disconnected or has no storage capacity available, and a time conflict occurs between two or more broadcast programs, the one with the highest priority rating is selected for display. If storage capacity is available, the programs having the lower ratings are recorded on the video recorder 17. The scheduler module 16 further maintains a database of information about the programs available on the video recorder 17, e.g. their title, duration and program category. If a gap is encountered in the schedule of the virtual channel, the scheduler module 16 searches the database for recorded programs having a length which is substantially equal to the length of the gap. If such programs are found, one of them is scheduled for the virtual channel to fill the gap. Alternatively, various shorter recorded programs are combined to fill the gap, or a longer recorded program is split into several parts, each filling a different gap in the schedule of the virtual channel, e.g. before and after a news bulletin. The scheduler module 16 may control the video recorder 17 to reproduce a program with slightly increased speed if it is just too long-to fill a gap, in order to fill the gap exactly or leave a small pause of predetermined length, e.g. 5 minutes. Similarly, a program which is just too short to fill a gap may be reproduced with slightly decreased speed, to avoid long pauses between programs. If the video recorder 17 is capable of simultaneously recording a first program and reproducing a second program, a broadcast program may be shifted in time so that it starts only when the reproduction of a recorded program has ended. The scheduler module 16 is thus capable of solving time conflicts between programs which are broadcast via the received broadcast streams, by time-shifting the programs or inserting recorded programs.

Figure 2:
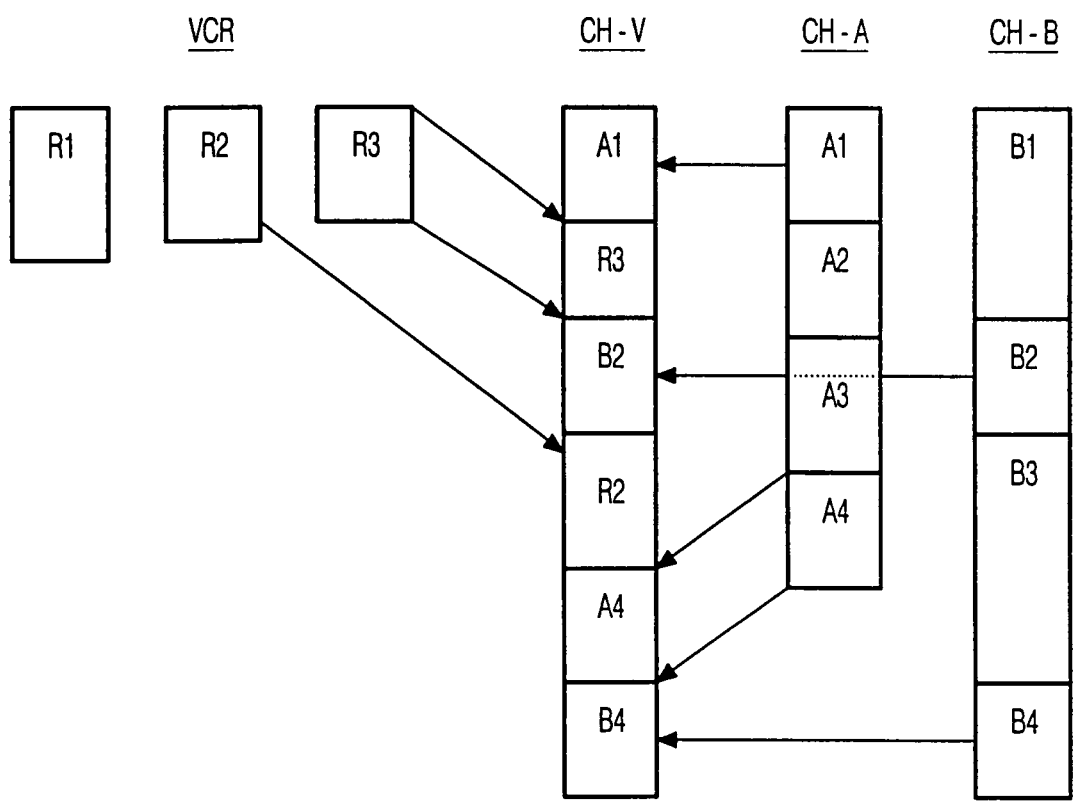
FIG. 2 illustrates the process of composing a personal program schedule for a virtual channel.

FIG. 2 shows the composition of a program schedule for a virtual channel CH-V comprising programs from a video recorder VCR and two broadcast streams CH-A and CH-B. Program A1 from CH-A and program B2 from CH-B are scheduled for CH-V, leaving a gap between them. Program R3 from VCR is scheduled to fill that gap. As R3 is slightly longer than the length of the gap, the reproduction speed of R3 is increased to make it end a few minutes before the start of B2. Program R2 from VCR is scheduled after B2, and program A4 from CH-A is scheduled after R2, which is achieved by shifting it in time, i.e. recording it while VCR is reproducing R2. When R2 ends, VCR starts reproducing A4, while still recording the remainder of R4. The reproduction speed of A4 is increased to make up for the lost time, so that the subsequent program B4 does not need to be shifted in time anymore.

Although the invention has been described with reference to particular illustrative embodiments, variations and modifications are possible within the scope of the inventive concept. Thus, for example, the various software modules may be implemented and combined in several ways or located in different devices, e.g. a set-top box or a video recorder. The video recorder 17 may be a conventional video cassette recorder or an optical recording system. It may comprise a fast disk-cache or several read/write mechanisms for simultaneous recording and playback. It may have an automatic loading mechanism for loading exchangeable data carriers such as video tapes and optical discs. Alternatively, the apparatus may generate messages to request the user to exchange data carriers.

In summary, the invention relates to an apparatus for reproducing programs, comprising storage means for storing a plurality of stored programs, for example, a television receiver comprising or controlling a video recorder. The apparatus comprises scheduling means for composing a personal reproduction schedule of a subset of said plurality of stored programs, in accordance with a user profile. If the apparatus is also capable of receiving broadcast programs, the scheduling means are adapted to include said broadcast programs in the reproduction schedule. A user-selectable virtual channel may be provided for easy inspection and execution of the reproduction schedule.

The invention claimed is:

1. An apparatus for reproducing programs, comprising:
   a receiver operable to receive broadcast programs from a plurality of channels;
   a selector operable to select a subset of said received broadcast programs, wherein said broadcast programs are assigned a priority when an overlap in time of said broadcast programs is determined;
   a digital video recorder or video cassette recorder for storing a plurality of stored programs, the digital video recorder or video cassette recorder being operable to simultaneously record one of the broadcast programs and reproduce a stored program;
   a scheduler operable to select a subset of the plurality of stored programs and a subset of the plurality of broadcast programs and to compose and organize a reproduction schedule of the subsets in accordance with a user profile, said profile comprising at least one temporal duration, the scheduler being operable to avoid an overlap between a broadcast program of the reproduction schedule and a stored program of the reproduction schedule by time-shifting the broadcast program in conjunction with the digital video recorder or video cassette recorder by:
      recording at least a part of the broadcast program while reproducing the stored program;
      determining a time duration between an end of the reproduction of the stored program and a beginning of reproduction of the broadcast program,
      filling said time duration with a part of at least one other stored program; and reproducing the broadcast program after the reproduction of the other stored program, within the time duration, is completed; and a presentation apparatus configured to present the subset of the plurality of stored programs and the subset of the plurality of broadcast programs in accordance with the reproduction schedule and create a virtual channel that is accessible through a preset number and visible in an EPG among a plurality of channels, the presentation apparatus operating in conjunction with the digital video recorder or video cassette recorder to time-shift the presentation of at least one broadcast program to comport with the at least one temporal duration.

2. A method of reproducing programs, comprising the steps of:

receiving broadcast programs from a plurality of channels;

selecting a subset of said received broadcast programs, wherein said broadcast programs are assigned a priority when an overlap in time of said broadcast programs is determined;

storing a plurality of programs, wherein the storing includes simultaneously recording one of the broadcast programs and reproducing a stored program;

selecting a subset of the plurality of stored programs and a subset of the plurality of broadcast programs and to compose and organize a reproduction schedule of the subsets in accordance with a user profile, said profile including at least one temporal duration, wherein said selecting step avoiding an overlap between a broadcast program of the reproduction schedule and a stored program of the reproduction schedule by time-shifting the broadcast program in conjunction with the storing step by, recording at least a part of the broadcast program while reproducing the stored program, determining a time duration between an end of the reproduction of the stored program and a beginning of reproduction of the broadcast program, filling said time duration with a part of at least one other stored program, and reproducing the broadcast program after the reproduction of the other stored program, within the time duration, is completed; and presenting the subset of the plurality of stored programs and the subset of the plurality of broadcast programs in accordance with the reproduction schedule and create a virtual channel that is accessible through a preset number and visible in an EPG among a plurality of channels, wherein the presenting step operating in conjunction with the storing step to time-shift the presentation of at least one broadcast program to comport with the at least one temporal duration.

* * * * *